(12) United States Patent
Carter

(10) Patent No.: US 11,460,270 B1
(45) Date of Patent: Oct. 4, 2022

(54) SYSTEM AND METHOD UTILIZING A SMART CAMERA TO LOCATE ENEMY AND FRIENDLY FORCES

(71) Applicant: George Carter, Dallas, TX (US)

(72) Inventor: George Carter, Dallas, TX (US)

(*) Notice: Subject to any disclaimer, the term of this patent is extended or adjusted under 35 U.S.C. 154(b) by 0 days.

(21) Appl. No.: 17/533,508

(22) Filed: Nov. 23, 2021

(51) Int. Cl.
*G06G 7/80* (2006.01)
*F41G 3/16* (2006.01)
*H04W 84/18* (2009.01)
*G06V 20/40* (2022.01)
*G06V 20/52* (2022.01)

(52) U.S. Cl.
CPC ............... *F41G 3/16* (2013.01); *G06V 20/41* (2022.01); *G06V 20/52* (2022.01); *H04W 84/18* (2013.01)

(58) Field of Classification Search
CPC .......... F41G 3/16; G06V 20/52; G06V 20/41; H04W 84/18
USPC ........................................................ 235/404
See application file for complete search history.

(56) References Cited

U.S. PATENT DOCUMENTS

| | | | | |
|---|---|---|---|---|
| 6,963,800 | B1* | 11/2005 | Milbert | F41H 13/00 701/423 |
| 8,678,824 | B2* | 3/2014 | Carter | F41A 33/00 434/11 |
| 9,223,494 | B1* | 12/2015 | DeSalvo | G06F 3/04883 |
| 2019/0037174 | A1* | 1/2019 | Paripally | H04N 7/147 |
| 2019/0049734 | A1* | 2/2019 | Scales | G02B 27/0176 |

* cited by examiner

*Primary Examiner* — Ahshik Kim
(74) *Attorney, Agent, or Firm* — Michael Diar

(57) ABSTRACT

A tactical awareness system. The system includes a plurality of soldiers affiliated with a friendly force, where each soldier has a man-worn computer, a Global Positioning System (GPS) device for determining a location of the soldier, and a smart camera for capturing an image. The plurality of soldiers communicates wirelessly with each other via a network. The location of each soldier is distributed to all soldiers affiliated with the friendly force via the network. The smart camera captures an image when activated by one of the plurality of soldiers and a target image recognition module is used for determining if an enemy or friendly force is identified in a captured image by the smart camera. Furthermore, each smart camera includes a Camera Orientation Module (COM) for obtaining the orientation relative to a known three-dimensional coordinate system of the smart camera.

26 Claims, 3 Drawing Sheets

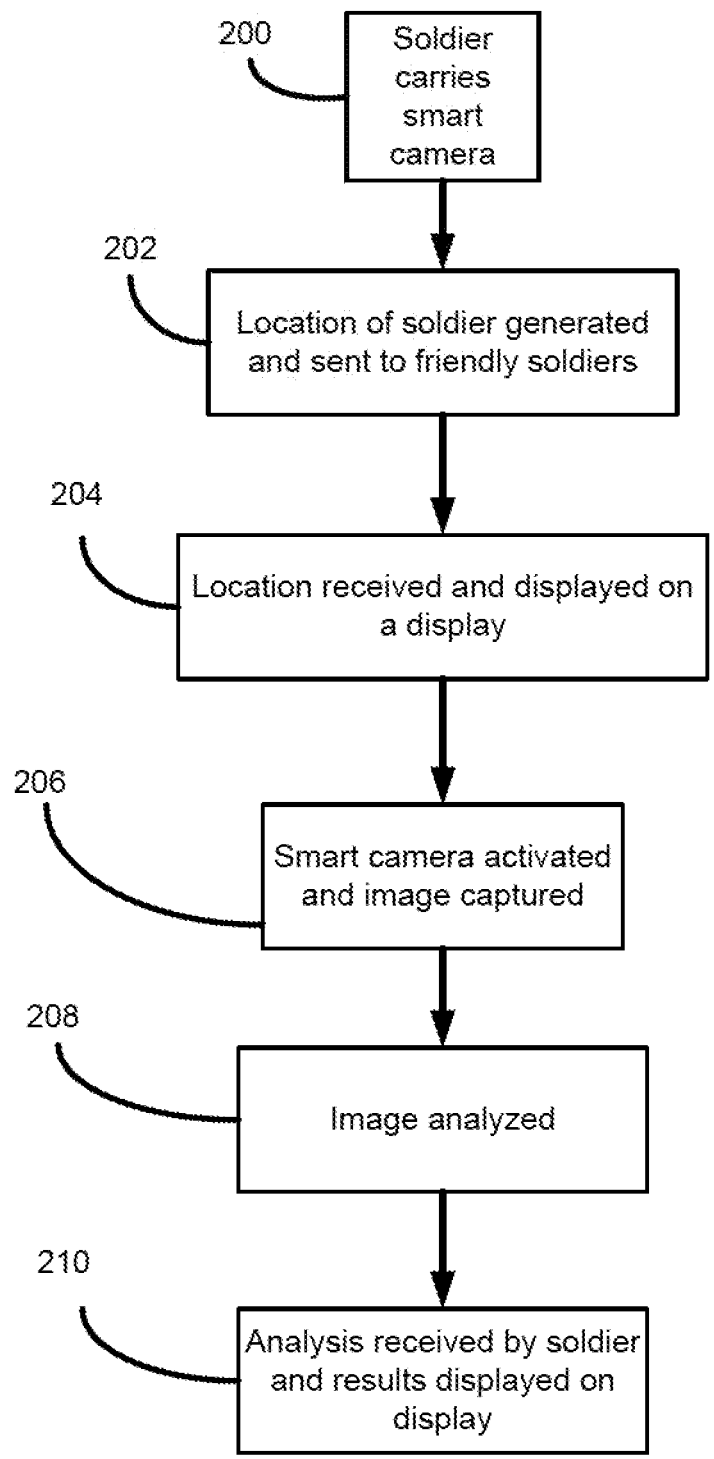

ions of the present invention.

SYSTEM AND METHOD UTILIZING A SMART CAMERA TO LOCATE ENEMY AND FRIENDLY FORCES

BACKGROUND OF THE INVENTION

Field of the Invention

This invention relates to tactical systems and methods. Specifically, and not by way of limitation, the present invention relates to a system and method utilizing a smart camera to provide situational awareness of targets and friendly individuals.

Description of the Related Art

During a tactical scenario, whether it is in a wartime situation or a simulated combat scenario, a key component for a positive outcome is situational awareness. Ideally, situational awareness involves knowing the location of the enemy and friendly forces. Oftentimes, during force-on-force engagement, locating and identifying enemy and friendly forces is difficult as soldiers attempt to remain hidden from view of opposing forces to prevent being targeted. For various reasons, human eyes often fail to locate other soldiers. It would be advantageous to have a system and method whereby a smart camera is utilized to determine the location of enemy and friendly forces to provide tactical or situation awareness in both real-world and training scenarios. It is an object of the present invention to provide such a system and method.

SUMMARY OF THE INVENTION

In one aspect, the present invention is directed to a tactical awareness system. The system includes a plurality of soldiers affiliated with a friendly force, where each soldier has a man-worn computer, a Global Positioning System (GPS) device for determining a location of the soldier, and a smart camera for capturing an image. The plurality of soldiers communicates wirelessly with each other via a network. The location of each soldier is distributed to all soldiers affiliated with the friendly force via the network. The smart camera captures an image when activated by one of the plurality of soldiers and a target image recognition module is used for determining if an enemy or friendly force is identified in a captured image by the smart camera. Furthermore, each smart camera includes a Camera Orientation Module (COM) for obtaining the orientation relative to a known three-dimensional coordinate system of the smart camera for determining a location of an identified enemy force from the captured image.

In another aspect, the present invention is directed to a method of providing tactical awareness to a soldier affiliated with a friendly force. The method begins by determining a location of each soldier affiliated with the friendly force and distributing, the location of each soldier to soldiers affiliated with the friendly force. A smart camera associated with one of the soldiers affiliated with the friendly force is activated, wherein activation of the smart camera captures an image. A target image recognition module then determines if an enemy or friendly force is identified in the captured image.

BRIEF DESCRIPTION OF THE DRAWINGS

FIG. 3 is a flow chart illustrating the steps of utilizing the system according to the teachings of the present invention.

DESCRIPTION OF THE INVENTION

Figure 1:
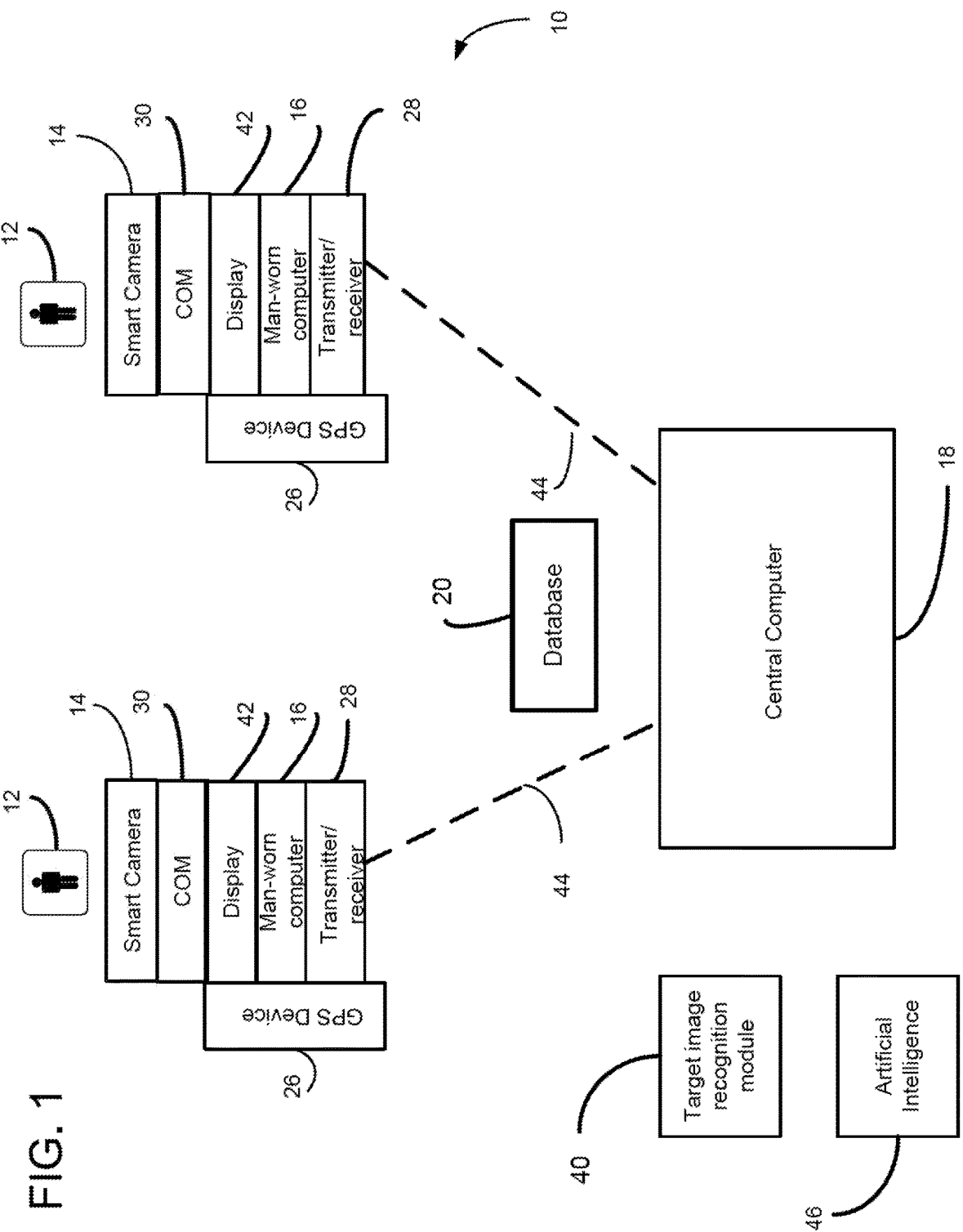
FIG. 1 is a block diagram of components of a tactical awareness system in a first embodiment of the present invention.

The present invention is a system and method which utilizes a smart camera to locate and identify enemy and friendly forces during force-on-force engagements, which may be in real-world combat or training scenarios. FIG. 1 is a block diagram of components of a tactical awareness system 10 in a first embodiment of the present invention. The present invention may be utilized in an actual combat situation or a simulated combat training session (e.g., image-based training systems) having a plurality of soldiers associated with two or more sides. "Friendlies" are designated for soldiers aligned or affiliated with one side while the "enemy" refers to members of an opposing forces. The system includes a plurality of soldiers 12, each soldier having a smart camera 14 and a man-worn computer 16. The smart camera may be an optical recording device which captures digital images and/or digital video. The smart camera 14 may be worn anywhere on the soldier, such as on a helmet or carried affixed to a weapon of the soldier (e.g., a scope), as a separate hand-held device (e.g., smart phone), a "body cam" worn on the soldier's body, or may optionally be located remotely from the soldier (such as at a location removed from the soldier, such as a drone or other remotely located device). Additionally, the man-worn computer 16 may be carried anywhere on the soldier or equipment worn by the soldier. The man-worn computer 16 may communicate with the smart camera 14. The communications link may be wired or wirelessly. The system also includes an optional central computer 18 which communicates with each man-worn computer 16 of the soldiers. The communication may be established and maintained through wireless communication techniques, such as a mobile phone network, or any type of wireless network, etc. The central computer may include a database 20 which stores captured or inputted images/video of enemy targets and soldiers. In one embodiment, the present invention may utilize a distributed communication network between the man-worn computers without the necessity of the central computer. Each soldier may optionally have a weapon, such as a firearm, a Global Positioning System (GPS) device 26, a wireless transmitter/receiver 28 and a Camera Orientation Module (COM) 30. The man-worn computer 16, the GPS device 26 and the transmitter/receiver 28 may be carried by the soldier 12 or carried as a separate device or devices. The COM 30 may be affixed to the smart camera 14 and provides data on the orientation of the smart camera (i.e., pitch, yaw, and roll). Additionally, the smart camera may include a device to estimate the range to an object or person in a captured image. The estimated range to an object/force in the image may be obtained through estimation due to size in the image, a separate range finder device (e.g., laser), use of auto-focus which established a distance from the lens to object in focus in the image, etc. The orientation of the smart camera and the distance from the smart camera to the captured image (e.g., identified friendly or enemy force) may be utilized to determine an estimated location of the identified force from a captured image. Additionally, range to the object/force in the image may be obtained by utilizing triangular or trilateration techniques from distances/orientation of the specified object/force in the image obtained from one or more smart camera of other soldiers.

The term "soldier" is used to refer to a person carrying the smart camera 14, riding in a vehicle (ground or airborne), or locating in an enclosure or any artificial structure but is not limited to persons associated with the military but may be encompassed for use by any organization where its members utilize weapons. The system may also include the central computer 18 in communication through the transmitter/receiver 28 to each soldier's man-worn computer 16. The GPS device 26 may generate a geographic location providing an exact location of a specific soldier. This geographic location may be provided to the central computer 18, and, in turn, distributed to each of the man-worn computers 16 of other soldiers. In another embodiment of the present invention, the geographic location may be distributed to other man-worn computers without the use of the central computer, such as in a distributed network. In addition, the system may include a target image recognition module 40 which determines if the image contains an enemy force, friendly force, weapon, or vehicle. The target image recognition module 40 may be located anywhere in the node, such as with the smart camera 14, the central computer 18, one of the man-worn computers 16 or any other node communicating in the system 10.

Figure 2:
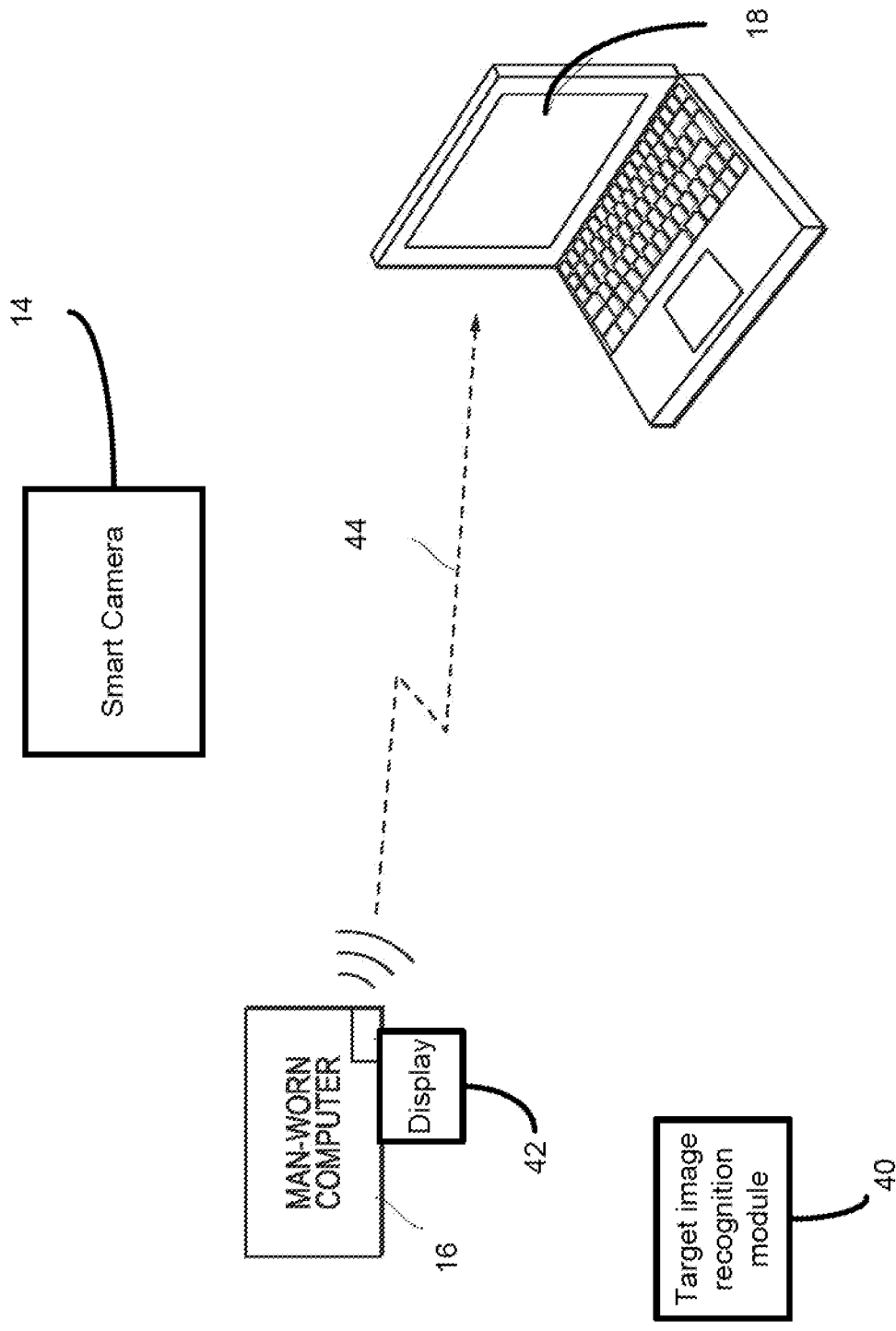
FIG. 2 is a block diagram of the items optionally carried by the soldier in one embodiment of the present invention.

FIG. 2 is a block diagram of the items optionally carried by the soldier 12 in one embodiment of the present invention. The soldier may carry the smart camera 14, the man-worn computer 16, a display 42 and optionally communicate with the central computer 18. The target image recognition module 40 may be located with the soldier or integrated within the central computer 18. The soldier may carry the smart camera 14, either separately or integrated in other equipment. The smart camera 14 is capable of digitally capturing an image. If the smart camera 14 is attached to a firearm, the smart camera may be aligned to a known sight of the firearm, such as use through a scope. The smart camera may be combined with a visor, googles, glasses, or other eyewear worn be the soldier. The man-worn computer may be any device having a processor. In addition, the soldier may utilize the display 42 for displaying information on the location of friendly and/or enemy locations. The information may include information on the location of friendly soldiers (i.e., soldiers aligned and associated with the soldier firing the firearm), in one embodiment, the display may be incorporated in eyewear worn by the soldier. The wireless transmitter/receiver 22 may also be located within the man-worn computer 16 or carried as a separate device. The man-worn computer includes components which may or may not be separate from other components of the system 10.

In another embodiment, all, or some of the components of the man-worn computer are integrated into a smart camera or single device. The wireless transmitter/receiver 28 may be any device which transmits and/or receives data via a communications link 44 to the central computer 18 or other node/man-worn computer, such as a standard 801.11b wireless connection, a telephonic or cellular connection, etc. The transmission and reception may utilize encrypted communications. In addition, the smart camera 14 or man-worn computer may include a mechanism or process to estimate range, or a separate range finding device, such as lidar, for ranging the distance from the smart camera 14 to the target. Additionally, the target located in the captured image may be another soldier or a vehicle, such as a tank, watercraft, aircraft, or vehicle for which the soldier is located.

The smart camera 14 may capture an image when activated by the soldier. Activation may be by pressing a button, a specific motion or action by the soldier or even pulling of a triggering device. Activation may also be where the smart camera runs continuously as video, warn the soldier of possible targets and save only that portion necessary when ascertaining that an enemy force is present. In one embodiment, the smart camera 14 is mounted on the firearm and aligned relative to a known orientation or sight of the firearm (e.g., through a scope) and captures an image when activated by the soldier (e.g., pressing a button). The image is then recorded and stored. The image may be distributed to other modules, such as the target image recognition module 40, the man-worn computer 16 or the central computer 18. As such, the smart camera may be integrated into a scope used on the firearm. The different components of the system may be located in the smart camera or portions of the system may be separate from the smart camera but still carried by the soldier (e.g., in the man-worn computer 18). In addition, the camera may transmit the captured image without recording the image, as the image may be recorded in another node, such as the man-worn computer. In one embodiment, the smart camera may communicate via a wireless or wired link with the man-worn computer. In one embodiment, the smart camera, the COM, any communication device, GPS device, display and any computing system may be incorporated into a smart mobile phone. In an alternate embodiment of the present invention, the smart camera may be carried and aimed separately from the firearm and/or soldier.

The system 10 may include the target image recognition module 40 which may be located anywhere in the system, such as the man-worn computer 16, the central computer 18 or in another node of the system 10. The target image recognition module 40 preferably includes stored data on images related to both enemy and friendly forces in the database 20, which are utilized to identify friendly and enemy forces. The target image recognition module 40 determines if an image contains either an enemy or friendly force. Oftentimes, forces are camouflaged or hidden behind obstructions, thereby capturing only a portion of the enemy/friendly force. The target image recognition module may utilize previously gathered images to help identify what the images are and if any forces are present in the image. In one embodiment, the target image recognition module utilizes artificial intelligence (AI) to learn from previously encounters, both in training and real-life combat to identify soldiers, weapons, vehicles, etc.

The COM 30 may also be utilized to determine the location of enemy and friendly forces. As the smart camera 14 is aimed in a specific direction, this orientation can be used to assist in orientating the soldier and the system 10 to establish where the different forces are located as captured in the image. Also, the COM may be used in combination with the target image recognition module to establish a position of an enemy force. The COM 30 may obtain the three-dimensional orientation of the smart camera relative to a geometric or any other fixed frame of reference. The orientation may take the form of pitch, yaw, and roll rotations about fixed axes (e.g., X, Y, Z). In one example of a three-dimensional reference scheme, Euler angles may be utilized which are three angles which define the orientation of a rigid body with respect to a fixed coordinate system. The orientation of the smart camera may be obtained through the measurement of the three elemental rotations (e.g., yaw, pitch, roll). Furthermore, the target image recognition module 40 or another component of the system preferably estimates the range to the identified enemy forces. Additionally, sighting of this enemy force by other soldiers also may improve the range accuracy of the enemy force.

The target image recognition module 40 may utilize silhouette extraction techniques of targets (e.g., soldiers, vehicles, human forms, etc.) to determine and recognize a target. For instance, silhouette extraction of targets may be obtained by utilizing computer vision techniques as well as ancillary identifiers, such as helmets, gun shape, vehicle features, etc. Furthermore, as targets are known to the system, the potential targets can be photographed and added to a database and artificial intelligence may learn to recognize specific targets. Additionally, Artificial Intelligence (AI) 46 may be implemented in the present invention, specifically within the target image recognition module 40 and central computer 18. Previously captured images and scenarios may be stored and provided to enable the AI to learn from previous encounters to assist in identifying friendlies and enemy soldiers or associated ancillary items. The continual collection of analyzed images may be used by the AI to assist in analyzing newly acquired images to determine if enemy or friendly forces are present.

The target image recognition module 40 may determine if the image is a recognizable target (e.g., a human form). The target image recognition module 40 may utilize several sources of information to verify the validity of the target. Furthermore, the COM 24 may provide the orientation of the smart camera relative to a known three-dimensional coordinate system through the measurement of roll, yaw and pitch rotations of the smart camera, the distance to the target, weather conditions (wind, attitude, etc.), movement of the smart camera, etc. which may also be used to determine the orientation of the captured image. The man-worn computer 16 may utilize various navigation and motion systems to collect data for accurate determination of the location of the captured image and enemy/friendly force, such as GPS, accelerometers, and magnetometers. This information may then be distributed to other friendly forces via the network.

In one embodiment, the captured image, a portion of the image (relevant cropped image) or several images and any relevant data are sent to the target image recognition module 40. In one embodiment, the target image recognition module 40 resides in the man-worn computer 16. In another embodiment, the target image recognition module 40 resides with the central computer 18. The smart camera 14, in one embodiment, to reduce transmission data, may send a cropped image of the relevant portion of the image to any remotely located target image recognition module 40. The central computer may also provide the functionality to manage a wireless network encompassing the plurality of soldiers having smart cameras. As discussed above, the target image recognition module 40 may reside anywhere within the system, such as the central computer 18 or within a smart phone. In one embodiment of the present invention, a terrain database and/or artificial intelligence (AI) 46 may be utilized. Artificial Intelligence (AI) may be implemented within the target image recognition module 40 and/or central computer 18, or in any other device (e.g., smart phone 48). Previously captured images and scenarios may be stored and provided to the AI to learn from previous encounters (e.g., identification of a friend or enemy). This image-based system is ideal for establishing and maintaining a high-fidelity representation of real-world terrain features. During each encounter, each shot fired will yield at least one high resolution uncompressed image. The man-worn computer has the capacity to save complete images including a substantial portion of the image which is not needed by the target image recognition module to determine hit/miss. Each image may be logged with geographic location and field of view orientation. Hundreds of images from exercises may be added to update the database with changes to structures and seasonal foliage. Saved images that contain a valid target may also be used to train AI programs.

In one embodiment of the present invention, the location of each soldier located within a designated area is shared with each other through the communication link 44. Each location associated with each soldier and their smart camera may be sent to the central computer 18 (or other system node) and relayed to the associated soldiers. Utilizing the display 42, the location of each soldier may be visually displayed. By providing the information of each "friendly" soldier, the inadvertent firing upon a friendly soldier (e.g., fratricide) is avoided. Additionally, in one embodiment of the present invention, once an enemy target is located via the smart camera 14 and identified by the target image recognition module 40, the location of an ascertained enemy may also be distributed to soldiers located in a designated area.

With reference to FIGS. 1 and 2, the operation of the system 10 will now be explained. The plurality of soldiers 12 enters an area of operations. Each soldier 12 carries the smart camera 14 and the man-worn computer 16. In one embodiment of the present invention, the GPS device 26 worn by each soldier generates a location of the soldier associated with the GPS device. The location provides the exact location of the soldier. This information may be sent to the central computer 18 or other soldiers' man-worn computers for use in determining the location of the various friendly forces near each soldier. The location of friendly soldiers may also be displayed on the display 42. A soldier observes an enemy soldier or target, aligns the smart camera 14 to capture an image. In one embodiment, the target image recognition module 40, upon receiving the image, determines if the image contains an identified friendly or enemy force within the image. The AI 46 may be utilized to determine if the image does indeed contain enemy or friendly forces. Additionally, the COM 30 may be utilized to further determine the location of the forces in the captured image. Furthermore, actual captured images may be shown on the display and the man-worn computer or any other component of the system may be configured to allow the soldier to determine or verify friendly or enemy forces, which can be inputted into the system and also shown on the display. The target image recognition module 40 may utilize various navigation and motion systems to collect data for accurate determination of location of the force in the captured image. Identified forces, both friendly and enemy, obtained from the image may also be shown on the display 42. In addition, the smart camera 14 may capture images which are enhanced by infrared detection or night vision systems enabling optical image pickup in reduced visibility. In one embodiment, the smart camera may capture images with spectral imagining (e.g., capture image using multiple bands across the electromagnetic spectrum) These images may be downloaded to other computer devices or printed. Additionally, the location of other forces may be distributed to other soldiers via the network.

FIG. 3 is a flow chart illustrating the steps of utilizing the system 10 according to the teachings of the present invention. With reference to FIGS. 1-3, the method will now be explained. In step 200, each soldier 12 carries the smart camera 14 and the man-worn computer 16. Next, in step 202, the GPS device of each soldier generates a location which may be transmitted to the central computer 18, other communication nodes, or other soldiers' man-worn computers 16. In step 204, the location of other "friendly" soldiers is received by each soldier and displayed on each soldier's display 34. Next, in step 206, a soldier captures an image by the smart camera 14. The image is then sent to the target image recognition module 40. In step 208, the target image recognition module 40 analyzes the image and determines if a friendly or enemy force (e.g., soldier, vehicle, weapon) is identifiable in the image. To assist in determining the identity and location of any forces in the image, the COM may be utilized on the smart camera 14 to determine an orientation from the soldier capturing the image. Furthermore, actual captured images may be shown on the display and the man-worn computer or any other component of the system may be configured to allow the soldier to determine or verify friendly or enemy forces, which can be inputted into the system and also shown on the display. Additionally, the target image recognition module 40 may utilize the AI 46 for interpreting the images. The AI is constantly learning from previously captured images so that the analyzed image may be compared to previously captured images and, in turn, used to determine the presence of an enemy or friendly force. Next, in step 210, the results of the analysis of the captured image are sent to the soldier. If a friendly or enemy soldier or force is determined to be in the image, the location and information may be sent to other soldiers and displayed on each soldier's display 42 by utilizing the communication link 44 to the central computer 18. The central computer 18 can then distribute the location and information on the force/soldier of the captured image to each soldier in the operational area.

In another embodiment of the present invention, the system 10 may perform the various computing functions in a distributed network. In this network, the man-worn computer communicates with one or more other soldiers (via the man-worn computer) using the wireless transmitter/receivers 28. Any necessary information, including the location of each soldier, is passed from one node (i.e., smart camera or man-worn computer) to another node. In one embodiment, the wireless transmitter/receiver enables the use of a wireless network for communicating between each smart camera/man-worn computer. The functionality of the target image recognition module 40 and the AI 46 may reside in any node, such as a man-worn computer or the central computer 18 depending on where efficiency and reduced latency occurs.

The various components (e.g., target image recognition module 40, wireless transmitter/receiver, etc.) associated with each soldier may be a separate component worn by the soldier and communicating with the smart camera or may be integrated into the smart camera or a smart phone. Furthermore, the smart camera may be incorporated with a vehicle, either manned or unmanned, aerial vehicle, etc.

In another embodiment of the present invention, the present invention may be used with indirect fire weaponry, such as artillery, mortars, etc. wherein there is no line of sight to the target from the position of the indirect fire weapon. The indirect fire weapon may utilize the COM 30 for determining camera orientation of the smart camera and the camera may be separate from an indirect fire weapon (e.g., located with a spotter having eyes on target). A spotter may be optionally equipped with a camera to capture an image and used in identifying friendly/enemy forces. Additionally, the spotter may utilize the camera to relay the enemy location to the soldier.

Although the present invention has illustrated the use of smart cameras worn or carried by soldiers, the present invention may also be incorporated in vehicles, such as tanks, aircraft, watercraft, and armored personnel carriers. In addition, the present invention may be used for various scenarios such as within law enforcement field, recreational field, in real-world combat operations, or in image-based training systems.

The present invention may be utilized between two soldiers, a single person against another target, a vehicle (including a tank, watercraft, aircraft, or surface vehicle) and another target, or in force-on-force exercises. The present invention provides a system providing real-time awareness of both the enemy and friendly forces.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications, and embodiments within the scope of the present invention.

What is claimed is:

1. A tactical awareness system, the system comprising:
   a plurality of soldiers, each soldier having a man-worn computer, a Global Positioning System (GPS) device for determining a location of the soldier and a smart camera for capturing an image;
   wherein each soldier within the tactical awareness system is affiliated with a friendly force;
   wherein the plurality of soldiers communicates wirelessly with each other via a network;
   wherein the location of each soldier is distributed to all soldiers affiliated with the friendly force via the network;
   wherein the smart camera captures an image when activated by one of the plurality of soldiers; and
   a target image recognition module for determining if an enemy or friendly force is identified in a captured image by the smart camera;
   wherein each smart camera includes a Camera Orientation Module (COM) for obtaining the orientation relative to a known three-dimensional coordinate system of the smart camera for determining a location of an identified enemy force from the captured image.

2. The tactical awareness system according to claim 1 wherein the COM is configured to estimate a distance from the smart camera to an identified enemy in the captured image.

3. The tactical awareness system according to claim 2 wherein the COM is configured with a separate device for determining an estimated distance from the smart camera to an identified enemy in the captured image.

4. The tactical awareness system according to claim 1 wherein a location of an enemy force identified in a captured image is distributed to all soldiers affiliated with the friendly force.

5. The tactical awareness system according to claim 1 further comprising a central computer for communicating with each man-worn computer of each soldier affiliated with the friendly force.

6. The tactical awareness system according to claim 1 wherein at least one smart camera is associated with a vehicle.

7. The tactical awareness system according to claim 1 wherein the smart camera is associated with an indirect fire weapon without line of sight to a target.

8. The tactical awareness system according to claim 7 wherein the smart camera is located separate from the indirect fire weapon.

9. The tactical awareness system according to claim 1 wherein the smart camera is aligned relative to a known sight of a shooting firearm.

10. The tactical awareness system according to claim 1 wherein the target image recognition module utilizes Artificial Intelligence (AI) for identifying enemy and friendly forces from captured images.

11. The tactical awareness system according to claim 1 further comprising a display to display locations of soldiers of the friendly force.

12. The tactical awareness system according to claim 1 further comprising a display to display locations of enemy forces.

13. The tactical awareness system according to claim 12 wherein the tactical awareness system is configured to enable a soldier to verify or input a location of a friendly or enemy force and display the verified location on the display.

14. The tactical awareness system according to claim 12 wherein the display may display the captured image on the display.

15. The tactical awareness system according to claim 1 wherein the target image recognition module resides with the central computing system.

16. The tactical awareness system according to claim 1 wherein the smart camera continuously runs as video and captures images containing possible enemy forces.

17. The tactical awareness system according to claim 1 wherein the target image recognition module is configured to analyze a captured image to determine if an enemy or friendly force is identified in the captured image.

18. A method of providing tactical awareness to a soldier affiliated with a friendly force, the method comprising the steps of:

determining a location of each soldier affiliated with the friendly force;

distributing the location of each soldier to soldiers affiliated with the friendly force;

activating a smart camera associated with one of the soldiers affiliated with the friendly force, wherein activation of the smart camera captures an image;

determining, by a target image recognition module, if an enemy or friendly force is identified in the captured image;

wherein each smart camera includes a Camera Orientation Module (COM) for obtaining the orientation relative to a known three-dimensional coordinate system of the smart camera.

19. The method according to claim 18 further comprising the step of displaying the location of soldiers affiliated with the friendly force on a display.

20. The method according to claim 18 further comprising the step of displaying the location of enemy forces on a display.

21. The method according to claim 18 wherein the target image recognition module employs Artificial Intelligence (AI) for identifying friendly and enemy forces on a captured image.

22. The tactical awareness system according to claim 21 wherein the AI is configured to utilize stored data on images related to both enemy and friendly forces to identify enemy or friendly forces in a captured image.

23. The method according to claim 18 wherein the COM is configured to estimate a distance from the smart camera to an identified enemy in the captured image.

24. The method according to claim 18 wherein the smart camera is associated with an indirect fire weapon without line of sight to a target.

25. The method according to claim 24 wherein the smart camera is located separate from the indirect firing weapon.

26. The method according to claim 18 wherein the smart camera continuous runs as video and captures images containing possible enemy forces.

* * * * *